(12) United States Patent
Ueki

(10) Patent No.: US 6,952,239 B2
(45) Date of Patent: Oct. 4, 2005

(54) SINE GENERATION CIRCUIT, PHASE SHIFT CIRCUIT AND TINT ADJUSTMENT CIRCUIT

(75) Inventor: Keijiro Ueki, Ota (JP)

(73) Assignee: Sanyo Electric Co., Ltd., Osaka (JP)

(*) Notice: Subject to any disclaimer, the term of this patent is extended or adjusted under 35 U.S.C. 154(b) by 564 days.

(21) Appl. No.: 10/142,931

(22) Filed: May 13, 2002

(65) Prior Publication Data

US 2002/0190763 A1 Dec. 19, 2002

(30) Foreign Application Priority Data

May 11, 2001 (JP) .................................. 2001-141192
May 11, 2001 (JP) .................................. 2001-141193

(51) Int. Cl.[7] .................................................. H04N 9/64
(52) U.S. Cl. ...................................... 348/654; 348/638
(58) Field of Search .............................. 348/654, 647, 348/649, 653, 638, 639, 726, 727, 507, 508; 327/129, 101, 103; 331/45; 330/252, 261; 329/304, 306, 307, 323, 346, 358; H04N 9/64, 9/66, 9/68, 5/455

(56) References Cited

U.S. PATENT DOCUMENTS 3,961,362 A * 6/1976 Lovely ......................... 348/653
4,797,732 A * 1/1989 Aketagawa et al. ......... 348/654
4,932,038 A   6/1990 Windus
5,006,818 A * 4/1991 Koyama et al. ............. 330/261
6,489,848 B2 * 12/2002 Smith et al. ................. 330/261
6,636,085 B2 * 10/2003 Okazaki et al. ............. 327/101

FOREIGN PATENT DOCUMENTS

JP   1-161907   6/1989
JP   2-111128   4/1990

* cited by examiner

Primary Examiner—Sherrie Hsia
(74) Attorney, Agent, or Firm—Morrison & Foerster LLP

(57) ABSTRACT

A phase shift circuit includes a first sine generation circuit generating a sine-converted output signal (sin θ) of the phase shift input signal (θ) and a reversed sine-converted output signal (−sin θ) of the phase shift input signal (θ), a cosine generation circuit generating a cosine-converted output signal (cos θ) of the phase shift input signal (θ), a first multiplication circuit, a second multiplication circuit, a third multiplication circuit, a fourth multiplication circuit, a first addition circuit adding an output signal of the first multiplication circuit to an output signal of the second multiplication circuit, and a second addition circuit adding an output signal of the third multiplication circuit to an output signal of the fourth multiplication circuit. This configuration makes the construction of a phase shift circuit for tint adjustment simple because of a coordinate transformation embedded in the configuration.

9 Claims, 4 Drawing Sheets

PRIOR ART

SINE GENERATION CIRCUIT, PHASE SHIFT CIRCUIT AND TINT ADJUSTMENT CIRCUIT

BACKGROUND OF THE INVENTION

1. Field of the Invention

This invention relates to a sine generation circuit for obtaining a sin θ (sine-converted) output signal from an input signal (θ), specifically to a sine generation circuit comprising bipolar transistors. This invention also relates to a phase shift circuit used in a television set, specifically to a phase shift circuit comprising bipolar transistors. Additionally this invention relates to a tint adjustment circuit used in a television set, specifically to a tint adjustment circuit comprising the bipolar transistors.

2. Description of the Related Art

A viewer of a television, in general, makes a tint adjustment of a chrominance signal by using external adjusting means, such as a volume dial, of the television set. For adjusting the tint, a demodulation axis (x-axis, y-axis) of the chrominance signal should be rotated in both directions. To rotate the modulation axis, the phase of a color carrier of 3.58 MHz applied to a modulator should be changed.

FIG. 6 shows a tint adjustment circuit for changing the phase of the color carrier of 3.58 MHz. In FIG. 6, the color carrier is applied to an input terminal 1, and a horizontal synchronous pulse is applied to a terminal 2.

A burst separation circuit 3 extracts only a burst signal from the color carrier inputted from the input terminal 1 based on a horizontal synchronous pulse. The extracted burst signal is converted to a continuous wave of the burst by a continuous wave generation circuit 4 (CW generation circuit).

This continuous wave is applied to the demodulator 6 of the chrominance signal through a phase shift circuit 5. The demodulator 6 receives the chrominance signal from a terminal 7 and demodulates a B-Y color difference signal and an R-Y color difference signal to terminals 8 and 9. Two kinds of continuous waves are required to demodulate these two signals and the phase shift circuit 5 supplies two continuous waves used for the B-Y color difference signal and the R-Y color difference signal to the demodulator 6.

Therefore, when a viewer changes the amount of phase shift of the phase shift circuit 5 using the external adjusting means, the tint of the chrominance signal can be adjusted based on the principal described above.

However, in the above circuit configuration, although the phase control as described above can be performed to the signal going through the demodulator 6, phase control cannot be performed to the signal which does not go through the demodulator 6. That is, although the tint adjustment can be performed to the modulated chrominance signal, the tint adjustment can not be performed to the chrominance signal after the demodulation.

When a DVD player is connected to a television set, a component signal (Y, Cb, Cr) is applied to the television set from outside. The chrominance demodulation has already been performed to such a signal. Thus, the tint adjustment can not be performed with the conventional circuit described above.

SUMMARY OF THE INVENTION

A sine generation circuit of this invention includes a first differential transistor and a second differential transistor with the emitters of these transistors being electrically connected to each other. An input signal (θ) is applied between a base of the first transistor and a base of the second transistor. A current source is connected to the emitters. The first transistor and the second transistor are configured so that a sine-converted output signal (sin θ) is generated at the collector of the first transistor and a reversed sine-converted output signal is generated at the collector of the second transistor.

With this configuration, the sine generation circuit can be constructed with a relatively simple circuit configuration.

A phase shift circuit of this invention, which shifts a phase of a coordinate input signal (x, y) by a phase shift input signal (θ) to generate an coordinate output signal (X, Y), includes a first sine generation circuit generating a sine-converted output signal (sin θ) of the phase shift input signal (θ) and a reversed sine-converted output signal (−sin θ) of the phase shift input signal (θ), a cosine generation circuit generating a cosine-converted output signal (cos θ) of the phase shift input signal (θ), a first multiplication circuit multiplying a first component of the coordinate input signal (x) by the cosine-converted output signal (cos θ), a second multiplication circuit multiplying a second component of the coordinate input signal (y) by the sine-converted output signal (sin θ), a third multiplication circuit multiplying the first component of the coordinate input signal (y) by the reversed sine-converted output signal (−sin θ), a fourth multiplication circuit multiplying the second component of the coordinate input signal (y) by the cosine-converted output signal (cos θ), a first addition circuit adding an output signal of the first multiplication circuit to an output signal of the second multiplication circuit, and a second addition circuit adding an output signal of the third multiplication circuit to an output signal of the fourth multiplication circuit. The first addition circuit provides a first component of the coordinate output signal (X), and the second addition circuit provides a second component of the coordinate output signal (Y).

With the above configuration, the construction of the phase shift circuit for tint adjustment using coordinate transformation becomes simple.

Furthermore, the sine generating circuit of the phase shift circuit includes a first differential transistor and a second differential transistor. The emitter of the first transistor and the emitter of the second transistor are electrically connected to each other and a current source is connected to the emitters of the first and second transistors. The phase shift input signal (θ) is applied between the base of the first transistor and the base of the second transistor. The first and second transistors are configured so that the sine-converted output signal (sin θ) is generated at the collector of the first transistor and the reversed sine-converted output signal (−sin θ) is generated at the collector of the second transistor.

The cosine generation circuit of the phase shift circuit includes a second sine generation circuit, which generates a sine-converted output signal (sin(θ/2)) of a signal corresponding to a half amount of the phase shift input signal (θ/2), a power circuit generating a signal corresponding to a second power of the sine-converted output signal (sin(θ/2)), an amplification circuit amplifying the signal corresponding to a second power of the sine-converted output signal (sin(θ/2)) by a factor of 2, and a subtraction circuit subtracting an output signal of the amplification circuit from a signal corresponding to a direct current component.

Each of the first sine generation circuit, the cosine generation circuit, and the first, second, third and forth multiplication circuits comprises a differential amplification device with a bipolar transistor.

Also, a tint adjustment circuit of this invention includes a demodulation circuit for demodulating a chrominance signal of a television signal in accordance with a carrier, and a phase shift circuit for shifting a phase of a first color difference signal and a second color difference signal outputted from the demodulator circuit. The tint is adjusted according to an amount of the phase shift of the first color difference signal and an amount of the phase shift of the second color difference signal.

According to the configuration described above, the tint adjustment of the television set can be easily performed on the component signal sent from an outside device such, as a DVD player.

The phase shift circuit of the tint adjustment circuit is a circuit for shifting a phase of a coordinate input signal (x,y) by a phase shift input signal (θ) to generate a coordinate output signal (X,Y). The phase shift circuit includes a sine generation circuit generating a sine-converted output signal (sin θ) of the phase shift input signal (θ) and a reversed sine-converted output signal (−sin θ) of the phase shift input signal (θ), a cosine generation circuit generating a cosine-converted output signal (cos θ) of the phase shift signal (θ), a first multiplication circuit multiplying a first component of the coordinate input signal (x) by the cosine-converted output signal (cos θ), a second multiplication circuit multiplying a second component of the coordinate input signal (y) by the sine-converted output signal (sin θ), a third multiplication circuit multiplying the first component of the coordinate input signal (y) by the reversed sine-converted output signal (−sin θ), a fourth multiplication circuit multiplying the second component of the coordinate input signal (y) by the cosine-converted output signal (cos θ), a first addition circuit adding an output signal of the first multiplication circuit to an output signal of the second multiplication circuit, and a second addition circuit adding an output signal of the third multiplication circuit to an output signal of the fourth multiplication circuit. The first addition circuit provides a first component of the coordinate output signal (X), and the second addition circuit provides a second component of the coordinate output signal (Y).

With the above configuration, the phase shit circuit can be formed by using the sine generation circuit, cosine generation circuit, and four multiplication circuits.

DETAILED DESCRIPTION OF THE INVENTION

Figure 1:
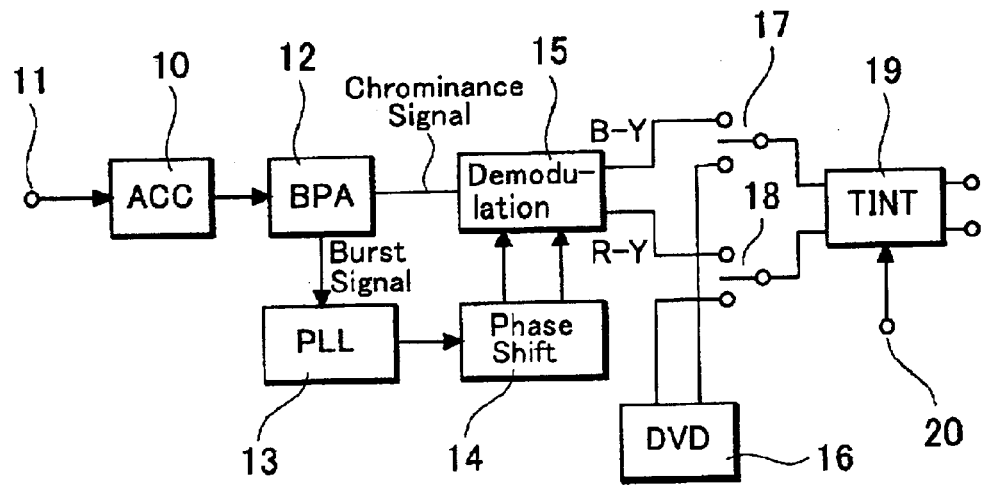
FIG. 1 is a block diagram of a demodulator for a chrominance signal used in an embodiment of this invention.

Next, an embodiment of this invention will be explained by referring to FIG. 1. An ACC (auto color control) circuit 10 automatically adjusts the level of a composite chrominance signal from an input terminal 11. A BPA (band-pass amplifier) 12 divides the composite chrominance signal outputted from the ACC circuit 10 into a chrominance signal and a burst signal.

A PLL (phase locked loop) circuit 13 has a phase comparator circuit, an LPF (low pass filter), and a VCO (voltage controlled oscillator) and generates a continuous wave, which is synchronized with the burst signal mentioned above. A phase shift circuit 14 generates two kinds of carriers for demodulation based on an output signal from the PLL circuit 13 (however, an adjustable phase shift is not performed). A demodulator 15 demodulates the chrominance signal separated and extracted by the BPA 12 based on the two carriers outputted from the phase shift circuit 14 and generates a B-Y signal and an R-Y signal.

Also, a DVD (digital video disc) 16 generates the B-Y signal and the R-Y signal as a video signal source. Switches 17 and 18 alternate the video signal sources. A tint circuit 19 (a phase shift circuit for tint adjustment) changes the phase of the B-Y signal and the R-Y signal from the switches 17, 18 based on the controlling voltage for the tint adjustment, which is controlled by a viewer from outside. The controlling voltage is applied to a control voltage 20 for tint adjustment.

Next, the operation of the demodulator of the chrominance signal will be explained. The level of the composite chrominance signal, which is inputted from the input terminal 11, is automatically adjusted by the ACC circuit 10. The BPA 12 divides the composite chrominance signal, the level of which has been automatically adjusted, into the chrominance signal and the burst signal. The PLL circuit 13 has the phase comparator circuit, the LPF, and the VCO and generates the continuous wave synchronized with the burst signal.

The continuous wave is then converted to two kinds of carriers for demodulation by the phase shift circuit 14, and applied to the demodulator 15. The B-Y color difference signal and the R-Y color difference signal are obtained from the chrominance signal at the demodulator 15, and applied to the switches 17, 18, respectively.

The B-Y color difference signal and the R-Y color difference signal are also applied to the switches 17, 18 from the DVD 16. One of the signals applied to each of the switches 17, 18 is then applied to the tint circuit 19 based on the selection mode of the switches.

The tint circuit 19 shifts the phase of the inputted signal, enabling the color adjustment. In the system shown in FIG. 1, the phase shift is performed on the demodulated signal, that is, the color difference signal. Thus, it is possible to perform the color adjustment by using the signal from the DVD 16.

Next, the principle of the tint circuit 19 will be explained. In order to obtain the coordinate output signal (X, Y) from the coordinate input signal (x, y) by the phase shift of θ, the input signal should be transformed based on the following coordinate transformation formula:

$$\begin{bmatrix} X \\ Y \end{bmatrix} = \begin{bmatrix} \cos\theta \sin\theta \\ -\sin\theta \cos\theta \end{bmatrix} \begin{bmatrix} x \\ y \end{bmatrix} = \begin{bmatrix} \cos\theta \cdot x + \sin\theta \cdot y \\ -\sin\theta \cdot x + \cos\theta \cdot y \end{bmatrix} \quad \text{(Equation 1)}$$

That is, a transformation based on the equations X=x·Cos θ+y·Sin θ and Y=−x·Sin θ+y·Cos θ is carried out by the circuit. Furthermore, the following relationship between sine and cosine functions are well known:

$$\sin^2\theta = \frac{1-\cos 2\theta}{2} \quad \text{(Equation 2)}$$

Since the following equations (3) and (4) can be obtained from equation (2), cos θ is given by the following equation (5). Accordingly, the cos θ is obtained from sin(θ/2).

$$2\sin^2\theta - 1 = -\cos 2\theta \quad \text{(Equation 3)}$$

$$\cos 2\theta = 1 - 2\sin^2\theta \quad \text{(Equation 4)}$$

$$\cos\theta = 1 - 2\sin^2\left(\frac{\theta}{2}\right) \quad \text{(Equation 5)}$$

Therefore, if the output signal sin(θ) can be generated from the input signal θ, a tint circuit, which is a phase shift circuit shifting the coordinate input signal (x,y) into the coordinate output signal (X,Y), can be obtained.

Figure 2:
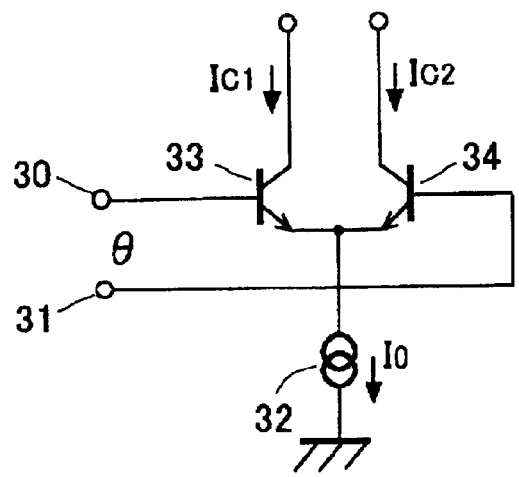
FIG. 2 is a circuit diagram of a sine generation circuit of this embodiment.

Next, the circuit for forming the output signal sin θ from the input signal θ will be explained. A differential amplifier shown in FIG. 2 can generate substantially the same signal as the output signal sin θ from the input signal θ. In FIG. 2, θ is applied between input terminals 30, 31 as an input signal. A constant current IO of a current source 32 goes through transistors 33, 34 as an electric current Ic1 and an electric current Ic2, respectively, based on the input signal θ.

Based on the relationship between the input and the output of the differential amplifier, and the relationship between the exponent function and tan h, the electric current Ic1 and Ic2 can be provided by the following equations (6), (7):

$$Ic_1 = \frac{\alpha I_0}{2}\left\{1 + \tanh\frac{\lambda}{2}\theta\right\} \quad \text{[Equation 6]}$$

$$Ic_2 = \frac{\alpha I_0}{2}\left\{1 - \tanh\frac{\lambda}{2}\theta\right\} \quad \text{[Equation 7]}$$

In equations (6) and (7), α represents a current ratio and λ is given by q/K·t, in which K is a Boltzman constant, t is absolute temperature and q is electric charge of an electron. Tan h θ is expressed by the following equation (8) developed in a Taylor series.

$$\tanh\theta = \theta - \frac{1}{3}\theta^3 + \frac{2}{15}\theta^5 \quad \text{[Equation 8]}$$

On the other hand, sin θ is expressed by the following equation (9) developed in another Taylor series.

$$\sin\theta = \theta - \frac{1}{3\times 2}\theta^3 + \frac{1}{120}\theta^5 \quad \text{[Equation 9]}$$

Here θ is expressed in radian, and the amount of phase shift is relatively small. Typical phase shifts (θ) are 0.7 and 0.8. Therefore, the values provided by equation (8) and equation (9) are very close to each other, provided that the amount of phase shifts (θ) is small. There is only a slight difference in the coefficient of the third power of θ.

Therefore, equation (6) and equation (7) can be approximated by equation (10) and the equation (11), respectively. The number "1" in equations (10), (11) indicates a constant current, which is not affected by the input signal, or the DC component.

$$Ic_1 = \frac{\alpha I_0}{2}\left\{1 + \sin\frac{\lambda}{2}\theta\right\} \quad \text{[Equation 10]}$$

$$Ic_2 = \frac{\alpha I_0}{2}\left\{1 - \sin\frac{\lambda}{2}\theta\right\} \quad \text{[Equation 11]}$$

Therefore, the differential amplifier shown in FIG. 2 provides substantially the same signal as the output signal sin θ based on an input signal θ when a certain condition is met: i.e. the amount of phase shift is small.

Figure 3:
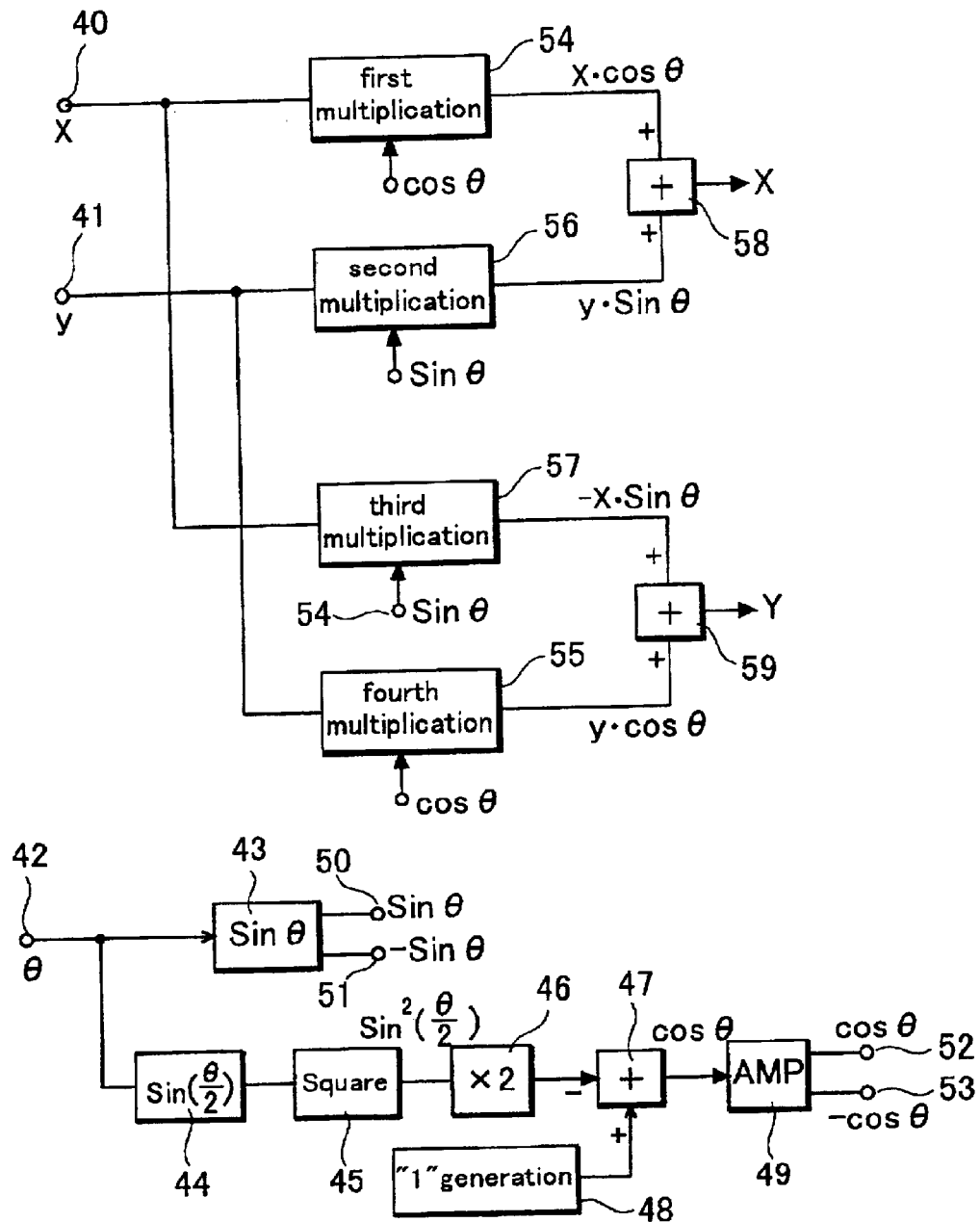
FIG. 3 is a block diagram of a phase shift circuit of this embodiment.

Next, the circuit for shifting a phase of a coordinate input signal (x,y) by a phase shift input signal (θ) to generate a coordinate output signal (X,Y) by using the differential amplifier of FIG. 2 is described with reference to FIG. 3. In FIG. 3, a signal x (the color difference signal B-Y) is applied to an input terminal 40 and a signal y (the color difference signal R-Y) is applied to an input terminal 41. The signal θ for tint adjustment is applied to a control terminal 42.

A first sine generation circuit 43 in FIG. 3 can be formed from the differential amplifier shown in FIG. 2. The circuit should be configured according to equation 5 for obtaining cos θ. As seen from FIG. 3, the circuit for obtaining cos θ includes a second sine generation circuit 44 generating sin(θ/2), a power circuit 45 generating a signal (sin² (θ/2)) corresponding to a second power of the output signal generated from the second sine generation circuit (sin(θ/2)), an amplification circuit 46 amplifying the output signal from the power circuit 45 by a factor of 2, and a subtraction circuit 47 subtracting an output signal of the amplification circuit 46 from 1 (an output signal from a direct current generation circuit 48), and an amplifier 49 generating both positive and negative output signals.

With the above circuits, terminals 50–53 provide sin θ, –sin θ, cos θ, and –cos θ signals, respectively.

Here, the cos θ signal applied to a first multiplication circuit 54 and a forth multiplication circuit 55 can be obtained from the terminal 52. Also, sin θ signal applied to a second multiplication circuit 56 and –sin θ signal applied to a third multiplication circuit 57 can be obtained from the terminals 50, 51 respectively.

In this manner, "x·cos θ" is obtained at the output terminal of the first multiplication circuit 54, "y·sin θ" at the output terminal of the second multiplication circuit 56, and "x·sin θ" at the output terminal of the third multiplication circuit 57. Additionally, "y·cos θ" is obtained at the output terminal of the forth multiplication circuit 55. A first addition circuit 58 adds the output from the first multiplication circuit 54 to the output from the second multiplication circuit 56, and a second addition circuit 59 adds the output from the third multiplication circuit 57 to the output from the forth multiplication circuit 55.

With the circuit configuration shown in FIG. 3, the following relations can be obtained; X=x·cos θ+y·sin θ, Y=–x·sin θ+y·cos θ. Therefore, the coordinate input signal (x,y) can be converted into the coordinate output signal (X,Y) by the phase shift input signal (θ).

Figure 4:
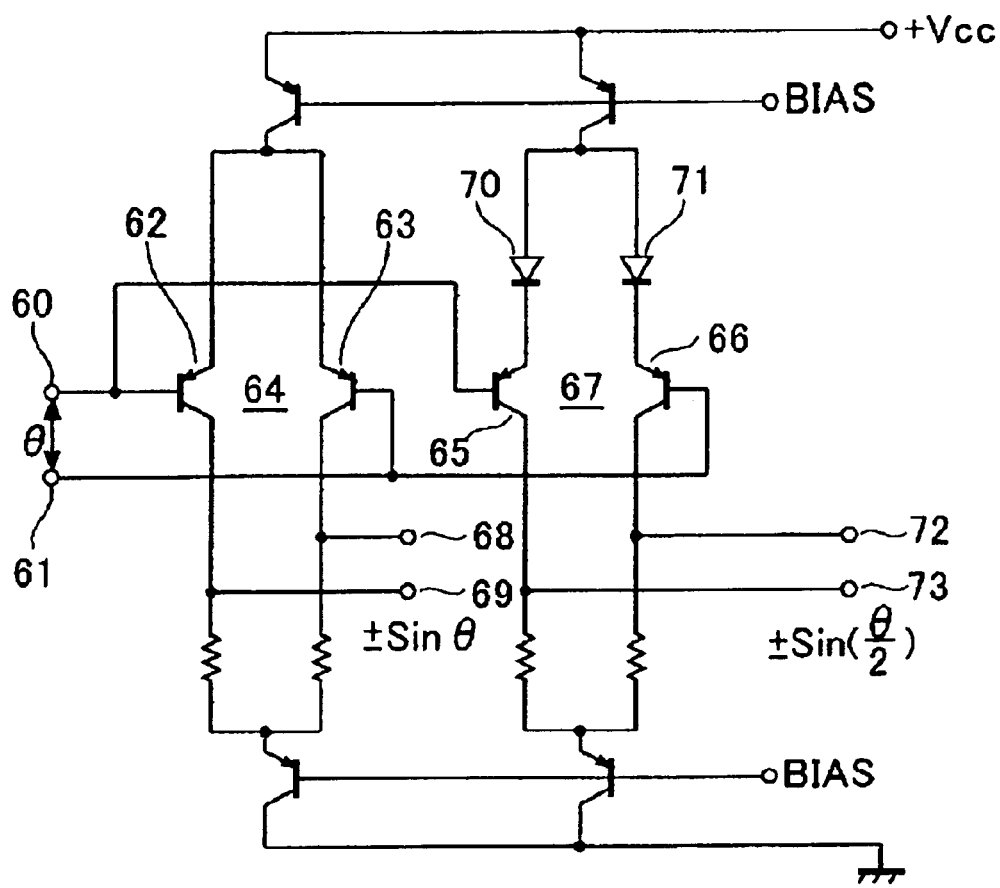
FIG. 4 is a circuit diagram showing an example of the first sine generation circuit and the second sine generation circuit of FIG. 3.

FIG. 4 is a circuit diagram of the first sine generation circuit 43 and the second sine(θ/2) generation circuit 44 in FIG. 3. In FIG. 4, the signal θ is applied between terminals 60, 61 and supplied between a differential amplifier 64 having differential transistors 62, 63 and a differential amplifier 67 having differential transistors 65, 66. The operation principle of the differential amplifier 64 is the same as that of the differential amplifier in FIG. 2. That is, sin θ and –sin θ can be obtained at terminals 68, 69.

Diodes 70 and 71 are connected to emitters of the transistors 65, 66 of the differential amplifier 67. Through the diodes 70, 71, terminals 72, 73 provide $\sin(\theta/2)$ and $-\sin(\theta/2)$, respectively.

Figure 5:
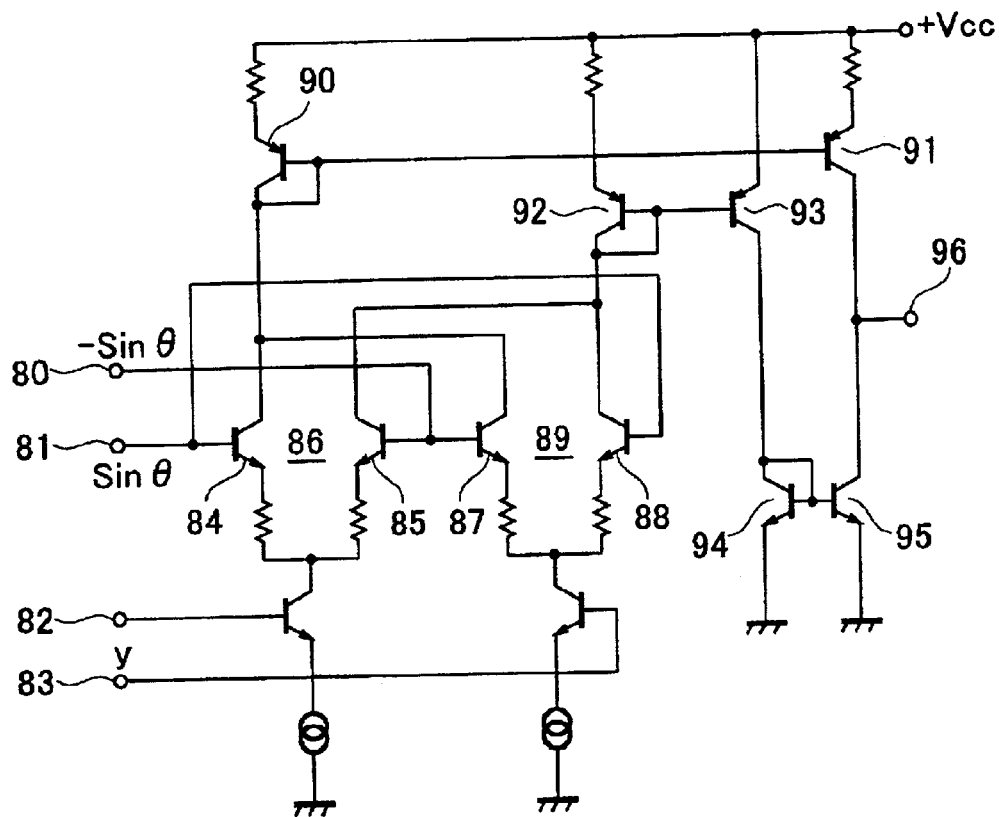
FIG. 5 is a circuit diagram showing an example of the power generation circuit and the first through forth multiplication circuits of FIG. 3.
Figure 6:
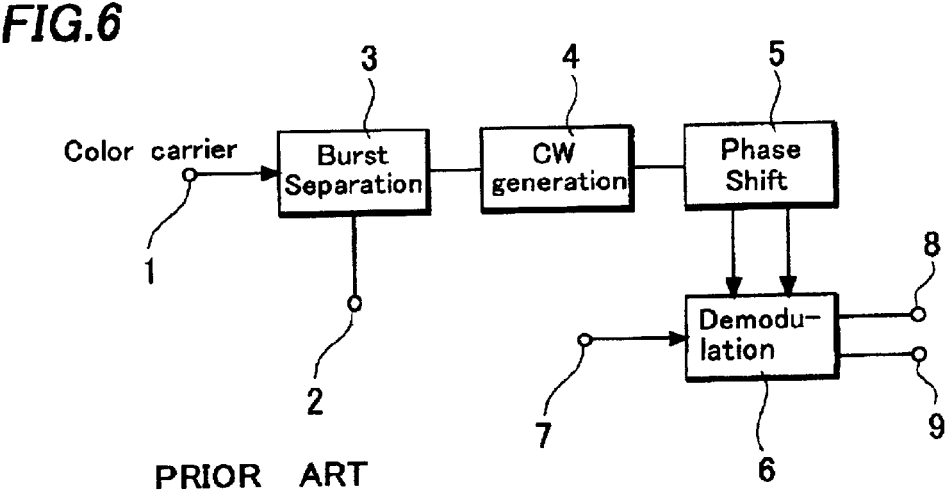
FIG. 6 is a block diagram of a conventional demodulator of chrominance signal.

In FIG. 3, the power generation circuit 45 and the first, second, third and forth multiplication circuits 54–55 include a multiplication circuit shown in FIG. 5. In FIG. 5, one of the input signals is applied to input terminals 80, 81, and the other input signal is applied to terminals 82, 83. The multiplication of the both signals is performed.

The main part of the multiplication circuit includes a differential amplifier 86 having transistors 84, 85 and a differential amplifier 89 having transistors 87, 88. The multiplication of the signal from transistor base and the signal from the emitter is performed.

Then, a part of the multiplication result is used as a collector current of the transistor 84 and a part of the multiplication result is used as a collector current of the transistor 88. The polarity of the collector current of the transistor 84 is inverted at transistors 90, 91 and then transmitted to an output terminal.

Also, the collector current of the transistor 88 is inverted at transistors 92, 93 and transistors 94, 95 and then transmitted to an output terminal. As a result, the multiplication result ($y \cdot \sin \theta$), from which the direct current components are canceled out, is obtained at an output terminal 96.

This invention enables the simple circuit configuration of sine generation circuit. Also the phase shift circuit using the coordinate transformation can be configured from the sine generation circuit, cosine generation circuit and four multiplication circuits.

Additionally, each of the sine generation circuit, cosine generation circuit and multiplication circuit can be configured from a bipolar transistor and the related resistors. Therefore, it is possible offer the phase shift circuit suitable for high-integration circuit.

Especially, the phase shift circuit of this invention is applicable to the phase shift circuit for shifting the phase of the first and second color difference signals outputted from the chrominance signal demodulation circuit. By adjusting the color in accordance with the amount of the phase shift provided by this phase shift circuit, the color adjustment of the television set can be easily performed using the component signals (Y, Cb, Cr) from an outside device such as DVD player.

The above is a detailed description of a particular embodiment of the invention which is not intended to limit the invention to the embodiment described. It is recognized that modifications within the scope of the invention will occur to a person skilled in the art. Such modifications and equivalents of the invention are intended for inclusion within the scope of this invention.

What is claimed is:

1. A sine generation circuit comprising:
   a first differential transistor and a second differential transistor, an emitter of the first transistor and an emitter of the second transistor being electrically connected to each other; and
   a current source electrically connected to the emitters of both the first transistor and the second transistor,
   wherein an input signal ($\theta$) is applied between a base of the first transistor and a base of the second transistor, the first transistor and the second transistor are configured so that a sine-converted output signal ($\sin \theta$) of the input signal ($\theta$) is generated at a collector of the first transistor and a reversed sine-converted output signal ($-\sin \theta$) of the input signal ($\theta$) is generated at a collector of the second transistor, and the input signal ($\theta$) is below +0.8 radian and above −0.8 radian.

2. A phase shift circuit shifting a phase of a coordinate input signal (x, y) by a phase shift input signal ($\theta$) to generate a coordinate output signal (X, Y), comprising:
   a first sine generation circuit generating a sine-converted output signal ($\sin \theta$) of the phase shift input signal ($\theta$) and a reversed sine-converted output signal ($-\sin \theta$) of the phase shift input signal ($\theta$);
   a cosine generation circuit generating a cosine-converted output signal ($\cos \theta$) of the phase shift input signal ($\theta$);
   a first multiplication circuit multiplying a first component of the coordinate input signal (x) by the cosine-converted output signal ($\cos \theta$);
   a second multiplication circuit multiplying a second component of the coordinate input signal (y) by the sine-converted output signal ($\sin \theta$);
   a third multiplication circuit multiplying the first component of the coordinate input signal (x) by the reversed sine-converted output signal ($-\sin \theta$);
   a fourth multiplication circuit multiplying the second component of the coordinate input signal (y) by the cosine-converted output signal ($\cos \theta$);
   a first addition circuit adding an output signal of the first multiplication circuit to an output signal of the second multiplication circuit, the first addition circuit providing a first component of the coordinate output signal (X); and
   a second addition circuit adding an output signal of the third multiplication circuit to an output signal of the fourth multiplication circuit, the second addition circuit providing a second component of the coordinate output signal (Y).

3. The phase shift circuit of claim 2, wherein the first sine generation circuit comprises:
   a first differential transistor and a second differential transistor, an emitter of the first transistor and an emitter of the second transistor being electrically connected to each other; and
   a current source electrically connected to the emitters of both the first transistor and the second transistor,
   wherein the phase shift input signal ($\theta$) is applied between a base of the first transistor and a base of the second transistor, and the first transistor and the second transistor are configured so that the sine-converted output signal ($\sin \theta$) is generated at a collector of the first transistor and the reversed sine-converted output signal ($-\sin \theta$) is generated at a collector of the second transistor.

4. The phase shift circuit of claim 2, wherein the cosine generation circuit comprises:
   a second sine generation circuit generating a sine-converted output signal ($\sin (\theta/2)$) of a signal corresponding to a half amount of the phase shift input signal ($\theta/2$);
   a power circuit generating a signal corresponding to a second power of the sine-converted output signal ($\sin (\theta/2)$) of a signal corresponding to a half amount of the phase shift input signal ($\theta/2$);
   a amplification circuit amplifying the signal corresponding to a second power of the sine-converted output signal ($\sin (\theta/2)$) by a factor of 2; and
   a subtraction circuit subtracting an output signal of the amplification circuit from a signal corresponding to a direct current component.

5. The phase shift circuit of claim 2, wherein each of the first sine generation circuit, the cosine generation circuit and the first, second, third and fourth multiplication circuits comprises a differential amplification device having a bipolar transistor.

6. A tint adjustment circuit comprising:
a chrominance signal demodulation circuit demodulating a chrominance signal of a television signal in accordance with a carrier of the television signal, the chrominance signal demodulation circuit outputting a first color difference signal and a second color difference signal; and
a phase shift circuit receiving the first and second color difference signals from the chrominance signal demodulation circuit and shifting a phase of the first color difference signal for tint adjustment and a phase of the second color difference signal for tint adjustment.

7. The tint adjustment circuit of claim 6, wherein the phase shift circuit shifts a phase of a coordinate input signal (x, y) by a phase shift input signal (θ) to generate an coordinate output signal (X, Y), the phase shift input signal (θ) corresponding to a tint adjustment voltage, the first color difference signal and the second color signal corresponding to the coordinate input signal (x, y), wherein the phase shift circuit comprises:
a sine generation circuit generating a sine-converted output signal (sin θ) of the phase shift input signal (θ) and a reversed sine-converted output signal (−sin θ) of the phase shift input signal (θ);
a cosine generation circuit generating a cosine-converted output signal (cos θ) of the phase shift input signal (θ);
a first multiplication circuit multiplying a first component of the coordinate input signal (x) by the cosine-converted output signal (cos θ);
a second multiplication circuit multiplying a second component of the coordinate input signal (y) by the sine-converted output signal (sin θ);
a third multiplication circuit multiplying the first component of the coordinate input signal (x) by the reversed sine-converted output signal (−sin θ);
a fourth multiplication circuit multiplying the second component of the coordinate input signal (y) by the cosine-converted output signal (cos θ);
a first addition circuit adding an output signal of the first multiplication circuit to an output signal of the second multiplication circuit, the first addition circuit providing a first component of the coordinate output signal (X); and
a second addition circuit adding an output signal of the third multiplication circuit to an output signal of the fourth multiplication circuit, the second addition circuit providing a second component of the coordinate output signal (Y).

8. A tint adjustment circuit comprising:
a chrominance signal demodulation circuit demodulating a chrominance signal of a television signal in accordance with a carrier of the television signal, the chrominance signal demodulation circuit outputting a first color difference signal (x) and a second color difference signal (y);
a sine generation circuit generating a sine-converted output signal (sin θ) of an input signal (θ) for color tint adjustment and a reversed sine-converted output signal (−sin θ) of the input signal (θ);
a cosine generation circuit generating a cosine-converted output signal (cos θ) of the input signal (θ);
a first multiplication circuit multiplying the first color difference signal (x) by the cosine-converted output signal (cos θ);
a second multiplication circuit multiplying the second color difference signal (y) by the sine-converted output signal (sin θ);
a third multiplication circuit multiplying the first color difference signal (x) by reversed the sine-converted output signal (−sin θ);
a fourth multiplication circuit multiplying the second color difference signal (y) by the cosine-converted output signal (cos θ);
a first addition circuit adding an output signal of the first multiplication circuit to an output signal of the second multiplication circuit, the first addition circuit providing a first output signal (X); and
a second addition circuit adding an output signal of the third multiplication circuit to an output signal of the fourth multiplication circuit, the second addition circuit providing a second output signal (Y),
wherein the first output signal and the second output signal (X, Y) provide a pair of shifted color difference signals for tint adjustment.

9. The tint adjustment circuit of claims 7 or 8, wherein the sine generation circuit, the cosine generation circuit, the first multiplication circuit, the second multiplication circuit, the third multiplication circuit and the fourth multiplication circuit comprise a differential amplifier having a bipolar transistor.

* * * * *